(No Model.) 4 Sheets—Sheet 1.

P. GENDRON.
TIRE PUNCHING MACHINE.

No. 466,823. Patented Jan. 12, 1892.

Witnesses:
P. M. Hulbert
M. B. O'Dogherty

Inventor:
Peter Gendron
By Nor. A. Sprague & Co.
Att'ys.

(No Model.) 4 Sheets—Sheet 2.

P. GENDRON.
TIRE PUNCHING MACHINE.

No. 466,823. Patented Jan. 12, 1892.

Witnesses:
P. M. Hulbert
J. W. B. Dougherty

Inventor:
Peter Gendron
By Thos. H. Sprague & Son
Attys.

(No Model.) 4 Sheets—Sheet 3.

P. GENDRON.
TIRE PUNCHING MACHINE.

No. 466,823. Patented Jan. 12, 1892.

Witnesses:
P. M. Hulbert
R. B. Dougherty

Inventor:
Peter Gendron
By Thos. H. Sprague & Co.
Attys.

THE NORRIS PETERS CO., PHOTO-LITHO., WASHINGTON, D. C.

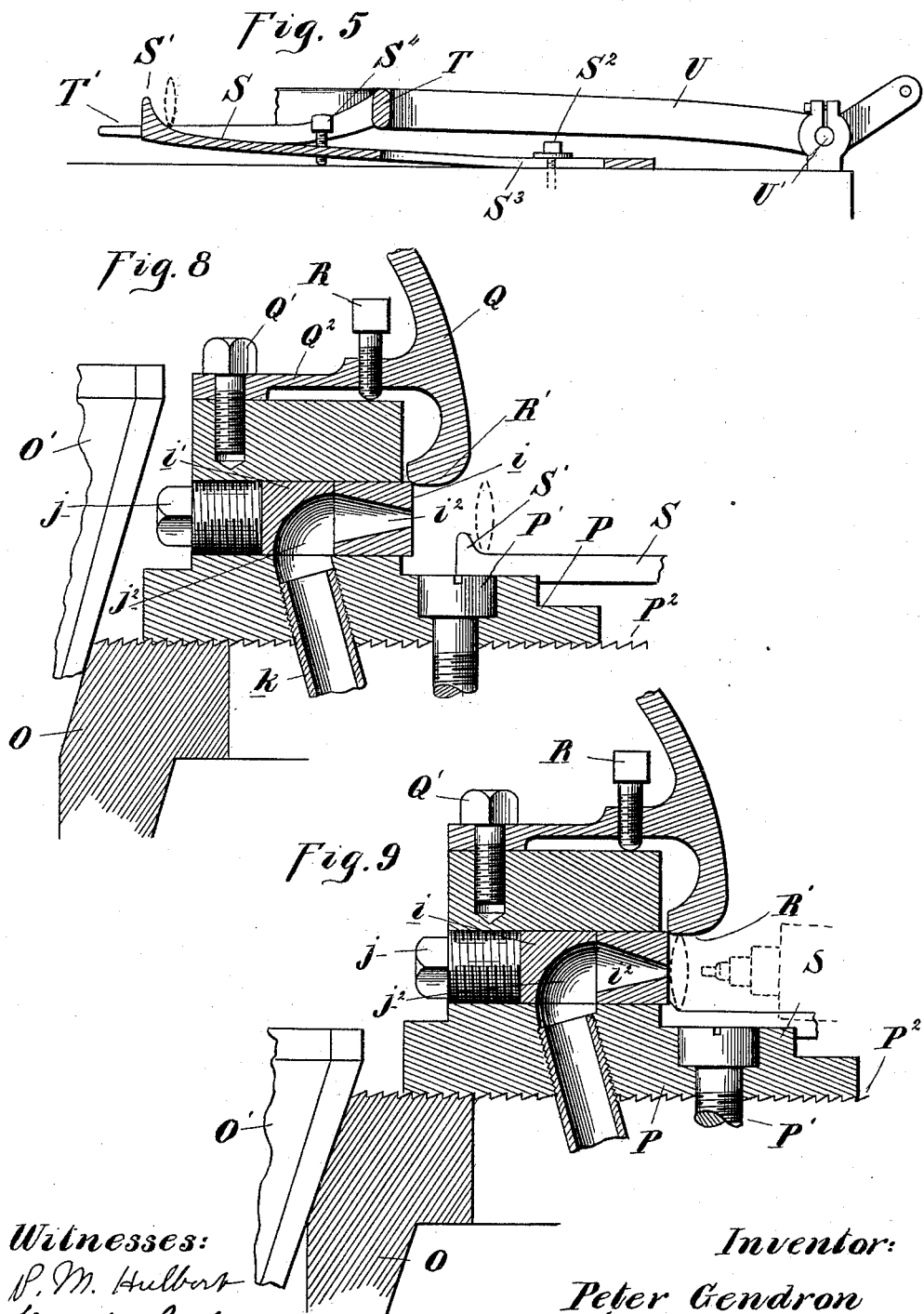

UNITED STATES PATENT OFFICE.

PETER GENDRON, OF TOLEDO, OHIO, ASSIGNOR TO THE GENDRON IRON WHEEL COMPANY, OF SAME PLACE.

TIRE-PUNCHING MACHINE.

SPECIFICATION forming part of Letters Patent No. 466,823, dated January 12, 1892.

Application filed June 4, 1891. Serial No. 395,014. (No model.)

*To all whom it may concern:*

Be it known that I, PETER GENDRON, a citizen of the United States, residing at Toledo, in the county of Lucas and State of Ohio, have invented certain new and useful Improvements in Tire-Punching Machines, of which the following is a specification, reference being had therein to the accompanying drawings.

This invention relates to new and useful improvements in tire-punching machines; and the invention consists in the peculiar construction of a machine designed to aperture a tire to receive the spokes of a metallic wheel or for the bolts used in a wooden wheel.

The invention consists, particularly, in the peculiar construction of a machine having a bed upon which are guides arranged on a circle, a series of radial dies within the circle, a corresponding series of punches outside the circle, means for actuating the dies and punches toward the tire on opposite sides thereof, and a suitable lifting or delivery rack arranged to remove the tire after it is punched.

The invention further consists in the peculiar construction, arrangement, and combination of the various parts, all as more fully hereinafter described.

Figure 1:
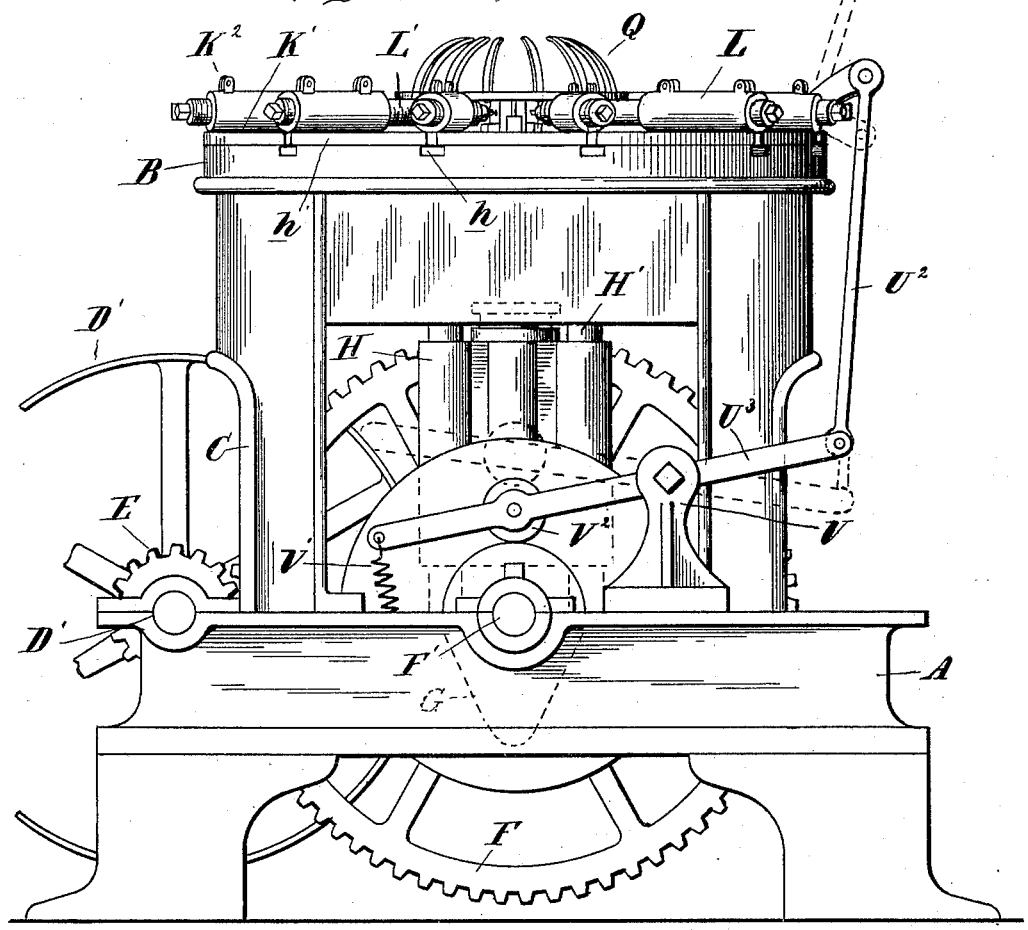
Figure 2:
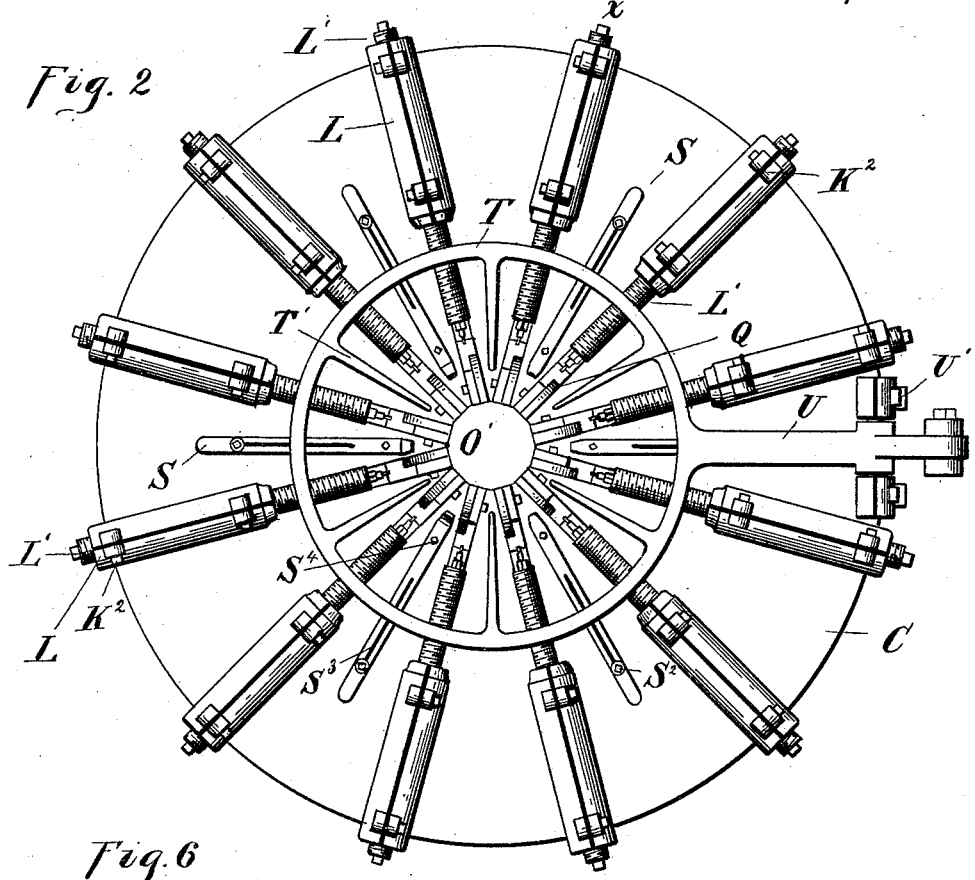
Figure 6:
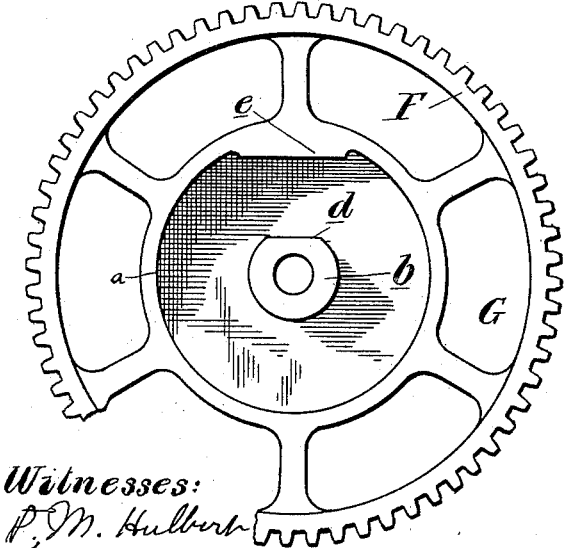
Figure 7:
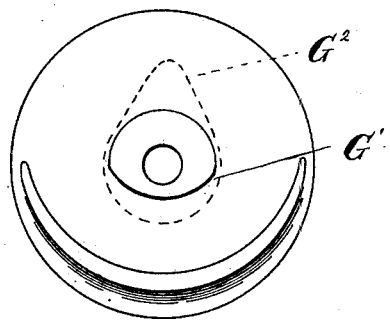
Figure 3:
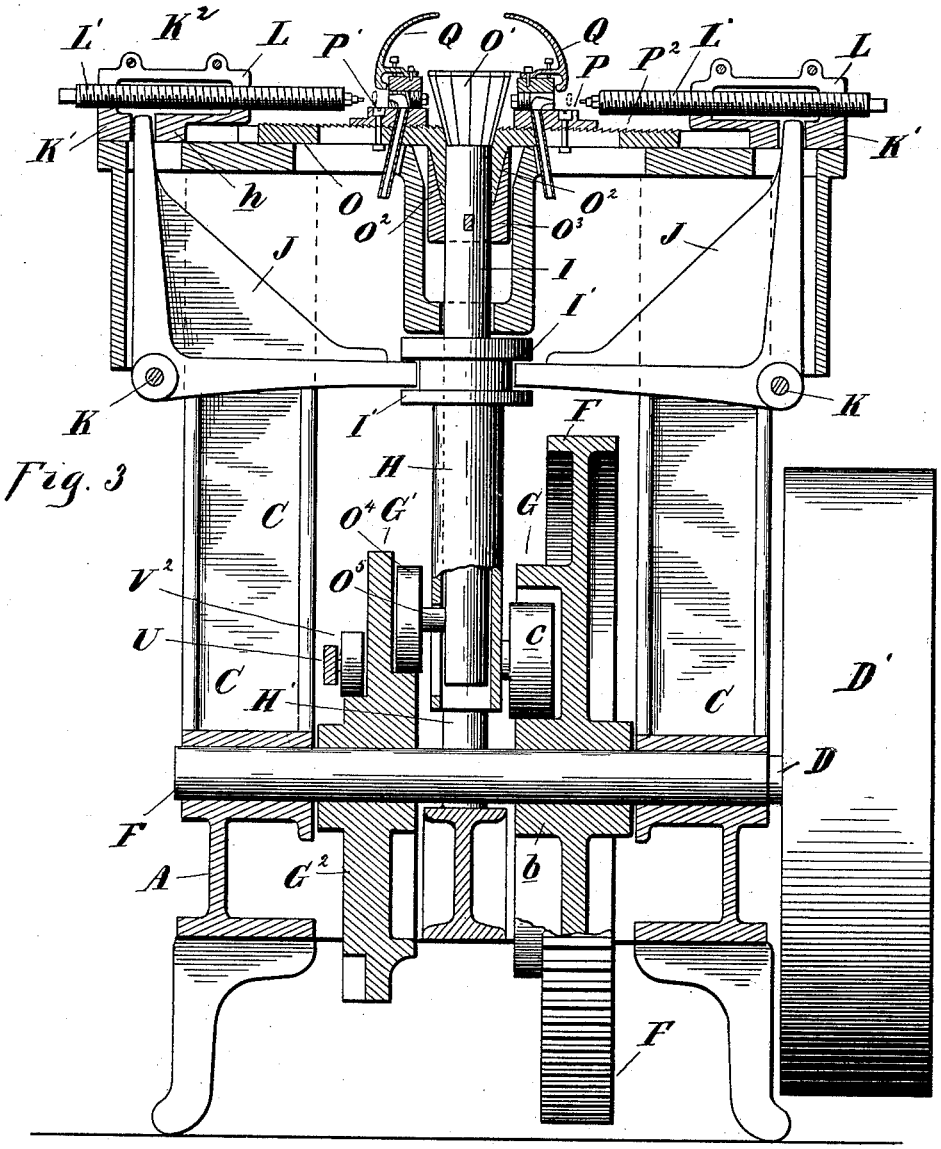
Figure 4:
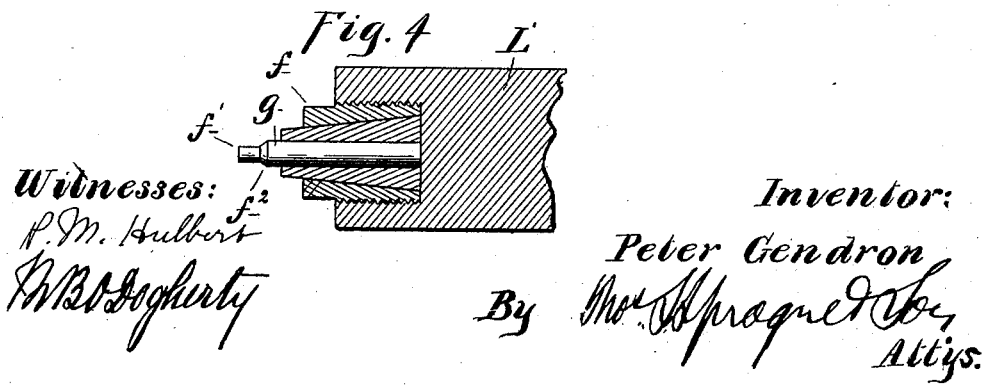

In the drawings, Figure 1 is a side elevation of my improved machine. Fig. 2 is a plan view thereof. Fig. 3 is a vertical central section on line $x$ $x$, Fig. 2. Fig. 4 is an enlarged section of one of the punches. Fig. 5 is an enlarged section showing supporting-guides. Figs. 6 and 7 are elevations of the operating-cams. Fig. 8 is an enlarged section similar to Fig. 3, showing construction of dies, guides, &c. Fig. 9 is a similar section showing the dies and punch in operating position.

A is the base.

B is the top, supported upon uprights C.

D is the main drive-shaft, driven by power applied to the pulley D'.

E is a drive-pinion of the shaft D, meshing with gear-wheel F upon the shaft F', journaled centrally in the base parallel with the shaft D. This shaft carries three cams G, G', and G², actuating, respectively, the punches, the dies, and the throwing-off spider. The cam G is preferably formed by a flange $a$ on the gear-wheel F and the hub $b$, cast integral therewith, a roller $c$ bearing on said hub. As the wheel rotates, the cut-away portion $d$ allows the roller to lower, and it is forced downward by means of the web $e$ upon the flange $a$, as plainly shown in Fig. 6. This roller is attached by a pin to a vertical frame H, which is guided upon suitable guide-rods H', secured at each side thereof, as plainly shown in Fig. 1. This frame is centrally apertured to receive the vertical shaft I, which operates in the manner hereinafter more fully described.

I' are collars on the upper end of the frame H, between which is formed an annular groove adapted to receive the ends of the bell-crank lever J, which are pivoted upon pivots K at the edge of the machine. The other arm of the bell-crank lever extends vertically through a slot in the cap of the machine and engages in a socket on the under side of the sliding punch-blocks K'. These punch-blocks are provided with screw-threaded sockets L, which are preferably split at the top and are clamped together by means of suitable clamping-bolts K''. These sockets are interiorly screw-threaded, adapted to receive the screw-threaded tool-holders L'. These tool-holders at the forward end are recessed to receive the plug $f$, which holds a suitable punch $g$ in position in the end of the tool-holder. This punch is provided with a straight portion $f'$ and the chamfer or countersink portion $f''$. The object of giving this shape to the punch is to form a countersunk hole in the tire, so that the head of the spoke may be riveted flush with the periphery of the tire.

It is evident that by turning the tool-holder L' it will be adjusted readily, and when it has been adjusted to the proper point by clamping the two parts of the socket L together it will be held in its adjusted position without danger of damage to the screw-thread in the operation of the machine.

The sliding blocks K' are provided with suitable heads $h$, entering suitable radial grooves in the top of the machine, being held in position by means of a cap $h'$, forming the top of the frame and also the top bearing for the head $h$. This top is held in position by suitable screws or bolts, and in case of wear of the heads $h$ or of the caps $h'$ the parts may be taken apart and dressed to make a close fit.

O are a series of like radially-movable beds extending from near the center of the machine outwardly. These beds have a limited sliding movement, and motion is imparted to them by the tapering head $O'$ upon the shaft I, which bears against the lugs $O''$, extending downwardly centrally of the machine and bearing with their inner faces against the head $O'$. Their outer faces are tapered inwardly and engage within a correspondingly-tapered collar $O^3$, secured on the shaft I, all so arranged that a downward movement of the shaft moves the beds O outwardly by means of the inclined bearing on the head $O'$, while an upward movement of the shaft returns the beds to their inner position by means of the inclined face on the collar $O^3$ bearing against the incline on the outside of the lug $O^2$. Motion is imparted to the shaft I from cam $G'$ (shown in Fig. 7) by means of roller $O^4$, bearing thereon, the roller being journaled upon a pin $O^5$, secured in the shaft, the frame H being suitably slotted.

To each of the beds O are adjustably secured the die-blocks P by means of bolts $P'$. The upper face of the bed is provided with notches $P^2$, with which corresponding notches on the blocks P engage. These blocks are apertured to receive suitable dies $i$, a block $i'$, and adjusting-screw $j$. The die is provided with a tapering opening $i^2$, which connects with a passage $j^2$ in the block $i'$, which connects with a downwardly-extending discharge-pipe $k$, through which the cut metal may drop into any suitable receptacle. Upon the top of the die-blocks are secured the guides Q by means of the bolts $Q'$, passing through the arm $Q^2$ thereof.

R is an adjusting-screw by means of which the guides may be adjusted. The guides extend downward to a point near the top of the dies and are provided with a lateral bearing-face $R'$. The tire is supported upon arms S, each provided with a guide horn or pin $S'$ at its end, having an inclined face to guide the tire to a seat upon the arm S and to thus center the tire upon the machine. These arms are radially adjustable by means of the bolt $S^2$, engaging in a slot $S^3$ of the arm, and are vertically adjustable by means of the set-screws $S^4$ in the arm bearing against the table-top. The arm I preferably make of spring metal to allow of this vertical adjustment and to hold it firmly upon the table at all times. The vertical adjustment is for the purpose of adjusting the tire in proper relation to the punch and dies; or, in other words, these arms form a support which centers the tire, so that it will receive a like bearing at all points from the dies, and also to support it at such a point vertically that the hole will be punched at the middle of the tire.

T is a circular rim having radial arms $T'$ extending on a plane beneath the tire, forming a spider or frame. This spider is secured to the lever U, pivoted at $U'$, its outer end being connected to a rod $U^2$, which in turn is connected to the lever $U^3$, pivoted upon bracket V on the base of the machine and held normally in position (shown in Fig. 1) by the tension of the spring $V'$. The roller $V^2$, secured to the side of this lever, bears on the cam $G^2$.

During the rotation of the shaft $F'$ the cam $G^2$ will by the connections described lift the spider to the position shown in dotted lines in Fig. 1 to discharge the finished tire, the spring V returning it to its normal position as soon as the shaft turns to allow it to act. The parts being properly adjusted and a tire being dropped over the guides Q falls upon the arms S, which supports it in the position shown in Fig. 8. The machine being in motion, the cam $G'$ first moves the shaft I downward, which by means of the tapering head $O'$ moves out simultaneously all the radial beds O until the dies bear firmly against the inside of the tire, as shown in Fig. 9. The bearing $R'$ prevents the possibility of the tire rising during the punching operation. While the die is thus in position the cam G moves the frame H downward, rocking levers J, which simultaneously move inward all the punches which enter the dies, and thus punch the desired holes. The punches and dies are retracted by the mechanism described, and the cam $G^2$ then actuates the spider, which, as previously described, discharges the punched tire and is returned to its normal position by the spring. The machine is now ready to repeat the operation.

It is evident that by adjusting the dies and punches tires of different diameters may be punched.

By moving the dies in and out, as described, I am enabled to feed the tire freely upon the machine and to move the dies to a position in which they will have precisely the proper bearing upon the inner face of the tire at the time the punch is doing its work. Then, also, when the dies are retracted the tire lies loosely upon the machine and can be removed without trouble.

I preferably arrange a single dovetail groove extending from the outside of the top of the machine to the inner edge thereof to receive both the punches and dies, thus insuring perfect alignment between the two parts and enabling me to construct the machine with economy and to repair it with the least possible amount of labor, the cap $h$ serving as a cap for the heads or dovetail portion of both the die-supporting beds and punches.

The head $O'$ not only forms the actuating means for the bed-plate O, but also forms an abutment against which these beds are pressed by the action of the punches, so that the entire power of the punches is applied to this head upon opposite sides, thereby preventing any possibility of a transverse strain to the shaft. By making the head O' actuate the beds O and arranging the dies adjustably upon these beds I am enabled always to give the same movement to the beds regardless of the size of the wheel or the location of the dies upon the beds.

While I have shown the dies, punches, and delivery mechanism all actuated from a single shaft by cams on that shaft, it is evident that other devices may be constructed for accomplishing the same work, and I do not limit myself to the precise construction of the parts herein shown.

What I claim is—

1. In a tire-punching machine, the combination, with a supporting-bed, of a series of radial punches and a corresponding series of dies, substantially as described.

2. In a tire-punching machine, the combination, with a supporting-bed, of a series of radial punches, a corresponding series of radially-movable dies, and actuating mechanism for said dies and punches, substantially as described.

3. In a tire-punching machine, the combination, with a supporting-bed and the punches, of a series of radially-moving dies and actuating mechanism for said dies, substantially as described.

4. In a tire-punching machine, the combination, with a supporting-bed, of a series of radial dies moving outwardly from the center and a series of oppositely-moving punches, substantially as described.

5. In a tire-punching machine, the combination, with a supporting-bed, of a series of radial guide-grooves therein, a series of dies in one end of said groove, a series of punches in the other end thereof, and means for moving said dies and punches toward each other, substantially as described.

6. In a tire-punching machine, the combination, with a supporting-bed, of a series of dies radially arranged on said bed, a corresponding series of punches, and a head for actuating said dies, substantially as described.

7. In a tire-punching machine, the combination, with the frame, of a series of die-supporting beds radially arranged centrally thereof, a series of dies adjustably secured on said beds, and a head for moving said beds simultaneously, substantially as described.

8. In a tire-punching machine, the combination, with the frame of the machine, of a series of radially-arranged sliding beds, a series of dies adjustably secured on said beds, a corresponding series of punches, and a central head adapted to move said beds outwardly and forming an abutment for said beds, substantially as described.

9. In a tire-punching machine, the combination, with the frame, of a series of dies radially arranged, a series of sliding beds upon which said dies are secured, a central shaft for moving said dies outwardly, and means for retracting said dies, substantially as described.

10. In a tire-punching machine, the combination, with the frame, of a series of radially-arranged dies, a series of sliding beds upon which said dies are secured, a central shaft against which said beds bear, an inclined bearing for actuating said beds outwardly, and a second inclined bearing connected with said shaft for retracting said beds, substantially as described.

11. In a tire-punching machine, the combination, with the bed, its dies, and punches, of a series of adjustable supporting-arms for centering a tire thereon, substantially as described.

12. In a tire-punching machine, the combination, with the bed, its dies, and punches, of supporting-arms for centering said tire and means for adjusting said arms laterally and vertically, substantially as described.

13. In a tire-punching machine, the combination, with the bed, of the spring-actuated arms S, having guiding-horns S', means for securing said arms adjustably to the frame of the machine, and the set-screw $S^4$ for adjusting said arms vertically, substantially as described.

14. In a tire-punching machine, the combination, with the movable dies, of the guide-arms Q, secured thereto, substantially as described.

15. In a tire-punching machine, the combination, with the movable dies, of the guide-arms Q, secured thereto, having the horizontal bearing R', substantially as described.

16. In a tire-punching machine, the combination, with the movable dies, of the guide-arms Q, secured thereto, and means for adjusting said guide-arms, substantially as described.

17. In a tire-punching machine, the combination of the die-supporting blocks P, adjustably secured upon the sliding bed O, substantially as described.

18. In a tire-punching machine, the combination, with the frame, of the sliding beds O, notched upon their upper surfaces, the die-supporting blocks P, having corresponding notches to engage therewith, the clamping-bolt P', and the dies in said blocks, substantially as described.

19. In a tire-punching machine, the combination, with a die-supporting block apertured to receive a die $i$, of the passage $i^2$, connecting with the passage $j^2$, and the discharge-tube $k$, substantially as described.

20. The combination, with a die-supporting block radially apertured, of the die $i$ and the screw-threaded block $j$ for adjusting said die, substantially as described.

21. The combination, with the frame of the machine having a series of central dies radially arranged, of a corresponding series of punches, means for adjusting said punches to and from said dies, and means for actuating said punches, substantially as described.

22. In a tire-punching machine, in combination with the frame, a series of central dies radially arranged, a corresponding series of punches, means for adjusting said punches to or from the dies, and a single actuating-shaft for said punches, substantially as described.

23. In a tire-punching machine, the combination, with the frame, the dies, and punches, substantially as described, of drive mechanism consisting of a central transverse shaft and connections from that shaft to the punches and dies, substantially as described.

24. In a tire-punching machine, the combination, with the frame, the punches, and dies, substantially as described, of drive mechanism consisting of a transverse shaft, a vertical shaft for actuating the dies, a vertical frame for actuating the punches, and cams upon said transverse shaft for actuating said vertical shaft and frame, substantially as described.

25. In a tire-punching machine, the combination, with the frame, of a series of centrally-arranged radial dies, a corresponding series of radial punches, the bell-crank levers J, engaging with said punch with one arm and with the other arm engaging with a bearing on the frame H, and means for actuating said frame, substantially as described.

26. In a tire-punching machine, the combination, with the frame, the punches, and dies, of a throw-off spider having radial arms extending beneath the plane of said punches and means for intermittently actuating said spider, substantially as described.

27. In a tire-punching machine, the combination, with the frame, the punches, and dies, of a spider consisting of a circular ring with interiorly-extending radial arms T', means for intermittently actuating said spider, and a spring adapted to return said spider to its normal position, substantially as described.

28. In a tire-punching machine, a throw-off mechanism consisting of the rim T, having radial arms T', the lever U, pivoted at U', the connecting-rod U'', the lever U''', means for actuating said lever, and the spring V', substantially as described.

In testimony whereof I affix my signature in presence of two witnesses.

PETER GENDRON.

Witnesses:
JAMES WHITTEMORE,
WM. A. MILLS.